United States Patent [19]
Koivunen

[11] 3,800,626
[45] Apr. 2, 1974

[54] TRANSVERSELY MOUNTED ENGINE DRIVEN TRANSMISSION

[75] Inventor: Erkki A. Koivunen, Livonia, Mich.

[73] Assignee: General Motors Corporation, Detroit, Mich.

[22] Filed: Jan. 26, 1973

[21] Appl. No.: 326,766

[52] U.S. Cl. .............................................. 74/695
[51] Int. Cl. ........................................ F16h 37/08
[58] Field of Search .................................... 74/695

[56] References Cited
UNITED STATES PATENTS
3,491,621  1/1970  Moan ................................ 74/695

Primary Examiner—Leonard H. Gerin
Attorney, Agent, or Firm—Donald F. Scherer

[57] ABSTRACT

A transmission in which a torque converter, a planetary gear set, final drive gears, and a differential are assembled in unitary package. The housing for the transmission includes a unitary cast portion. This portion houses the torque converter, final drive gears and differential, and, has a plurality of spaced parallel walls in which are formed a plurality of bearing supports. The supports provide locations for rotatably mounting the final drive gears, and the output shafts of the differential.

2 Claims, 3 Drawing Figures

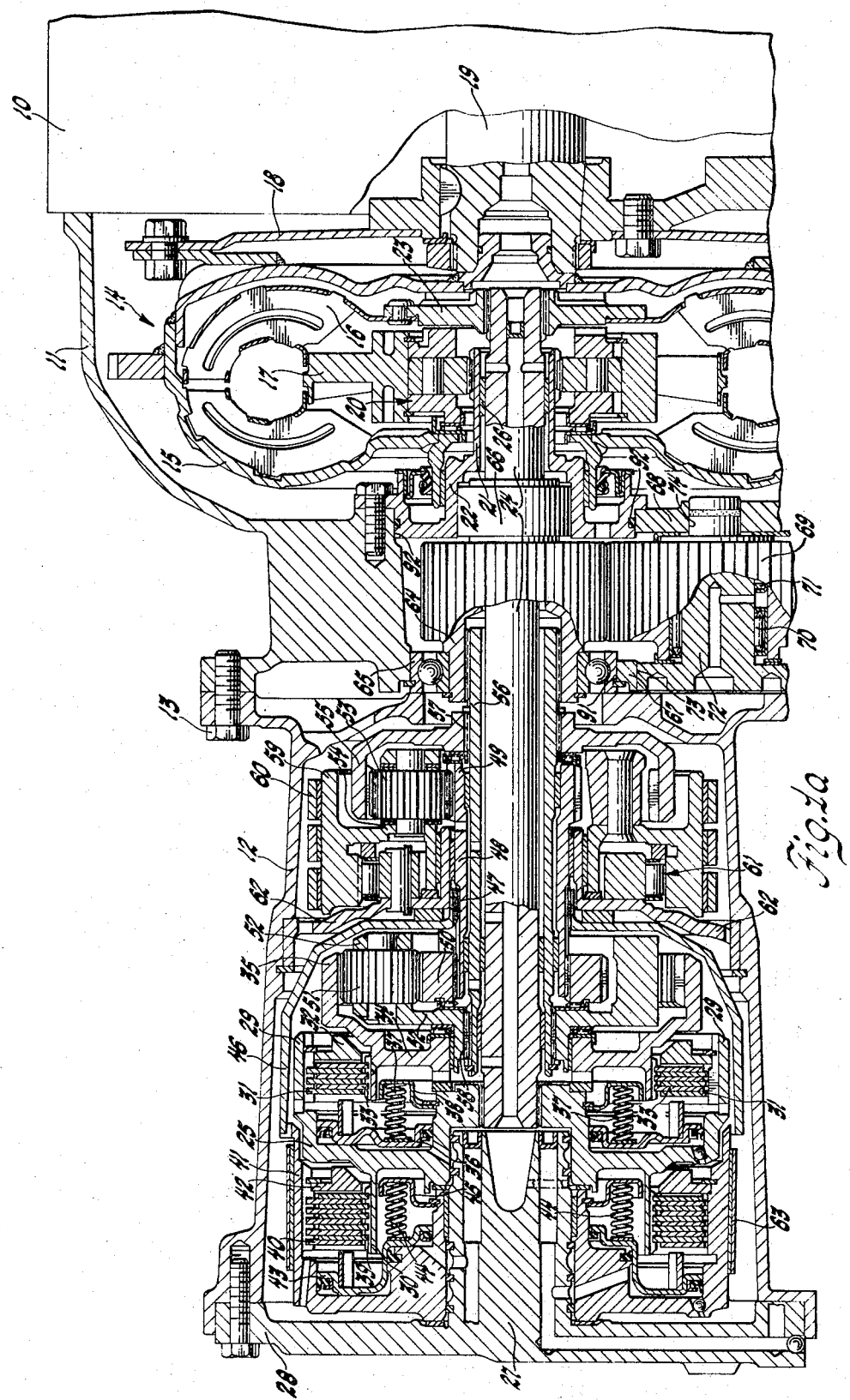

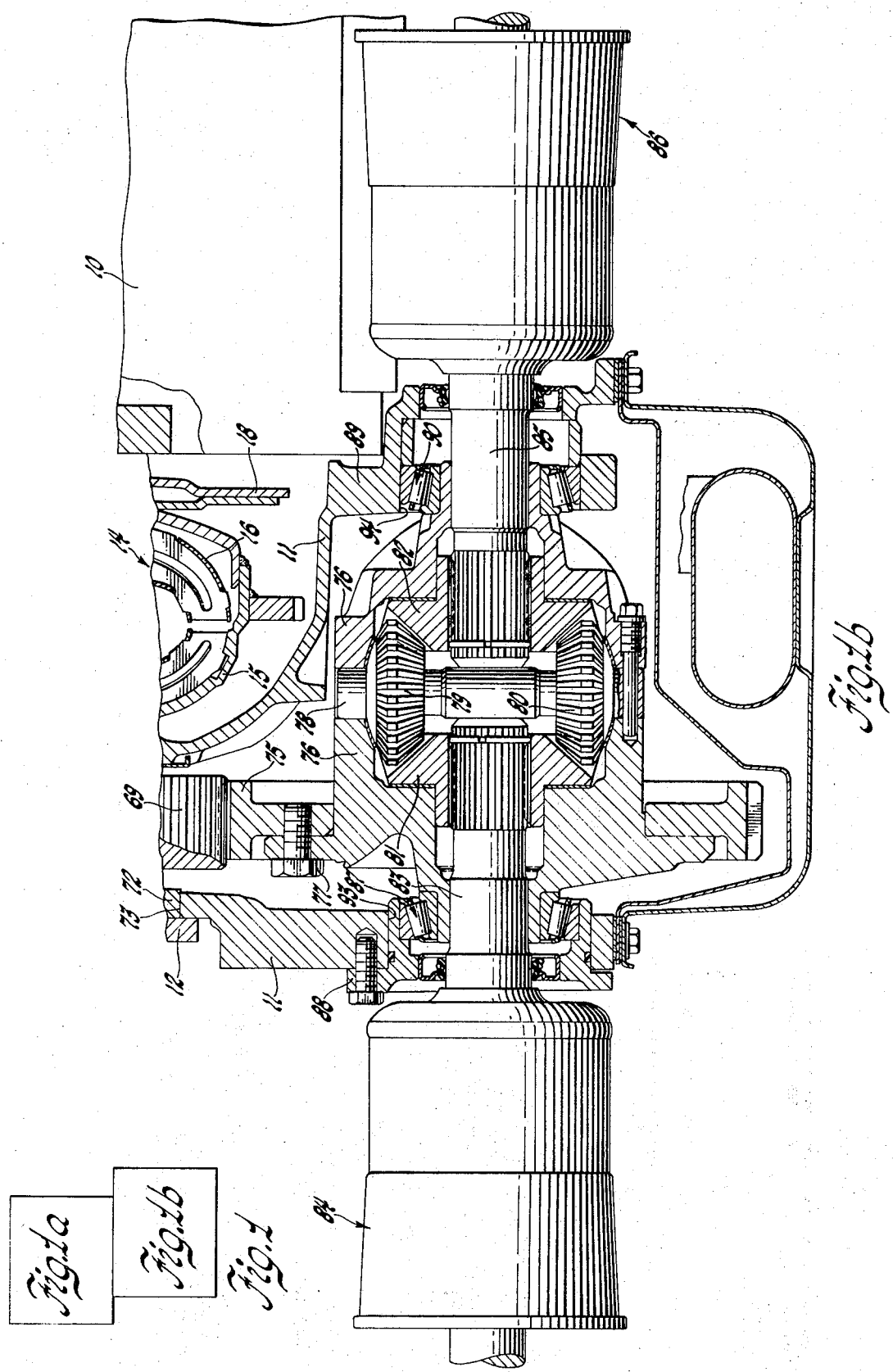

TRANSVERSELY MOUNTED ENGINE DRIVEN TRANSMISSION

This invention relates to transmissions and more particularly to transversely mounted transmissions having the torque converter, planetary gearing and differential gearing in a unitary package.

The present invention is utilized in engine driven transmissions, wherein the engine and transmission are mounted transversely in the vehicle to provide either a front wheel or rear wheel drive. In such transversely mounted engine and transmission combinations, the transmission torque converter, planetary gear set, and differential are mounted in close proximity due to the space limitations placed on these types of drives. In prior art transmissions of this type, two basic arrangements have been utilized. In one type, the torque converter is mounted directly on the engine, while the planetary gear set and differential are mounted in a housing placed below the torque converter and parallel with the engine. Normally, a chain drive is provided between the torque converter output and planetary gear set input in these transmissions.

In the other typical arrangement, the torque converter and planetary gear set are mounted coaxially with the engine and the differential disposed below the engine and torque converter. In this type of transmission, a gear drive or chain drive is provided between the planetary gearing output shaft and the input member of the differential.

The prior art transmissions utilizing the latter type of construction generally include a housing for the torque converter, a housing for the planetary gearing arrangement, and a housing for the drive gearing between the planetary gearing and the differential. These three housings are sandwiched together by threaded fasteners and utilize dowel pins to maintain alignment between the various housings. The alignment of the housings in these types of transmissions, particularly between the final drive gear housing and the torque converter housing is critical in that alignment of the bearing supports must be maintained. Generally, the bearing supports are located in pairs with one bearing support being in the torque converter housing and the other bearing support being in the final drive gear housing.

The present invention utilizes a single housing for the torque converter, final drive gearing, and the differential. With the unitary housing it is possible to machine the bearing support surface on a single machine tool such that the pairs of bearing support surfaces can be machined coaxially thereby maintaining the alignment therebetween. This, of course, eliminates the need for machining dowel pin locations to insure proper alignment of the bearing supports for the final drive gearing and the differential output members. This structure also reduces machining and assembly costs to provide a more economical transmission.

It is therefore an object of this invention to provide in an improved transversely mounted engine and transmission, a unitary torque converter and differential housing having aligned bearing support surfaces.

It is another object of this invention to provide in an improved transversely mounted engine and transmission, a single torque converter and differential housing having aligned bearing support surfaces for the output drive gear members and the differential output shafts.

A further object of this invention is to provide in an improved transversely mounted engine and transmission, a single torque converter and differential housing having parallel spaced walls with a plurality of aligned bearing support surfaces therein for supporting a plurality of output drive gears and a pair of differential output shafts.

These and other objects and advantages of the present invention will be more apparent from the following description and drawings.

FIG. 1 is a block diagram depicting the arrangement of FIGS. 1a and 1b;

FIG. 1a is a cross sectional elevational view of a portion of a transmission utilizing the present invention; and FIG. 1b is a partial sectional elevational view of another portion of the transmission which when combined with FIG. 1a provides a complete elevational view of the transmission.

Referring to FIGS. 1a and 1b, wherein like characteristics designate the same or corresponding parts, there is shown, a conventional internal combustion engine 10 which may be of the rotary piston or reciprocating piston type. A torque converter and differential housing 11 is secured to the engine 10 by threaded fasteners, not shown. A planetary gear housing 12 is secured to the torque converter and differential housing 11 by a plurality of fasteners 13.

A torque converter generally designated 14 includes an impeller 15, a turbine 16 and a stator 17. This is a conventional torque converter in which the impeller 15 is secured to a flex plate 18 which in turn is secured to the engine crank shaft 19 thereby providing a drive between the engine 10 and the torque converter 14. The stator 17 is drive connected via a one way clutch 20 to a sleeve shaft 21 which is an extension of the bearing housing 22 secured to the torque converter and differential housing 11. The turbine 16 has a hub 23 which is splined to a shaft 24 which in turn is splined to a clutch input housing 25. The shaft 24 is journaled in the sleeve shaft 21 by a journal bearing 26. The clutch input housing 25 is rotatably supported on a cylindrical member 27 which is integral with an end cap 28, which end cap 28 is secured to the planetary gearing housing 12.

The clutch input housing 25 has an internally splined portion 29 and an externally splined portion 30. The internally splined portion 29 has splined thereto a plurality of friction discs 31 and a backing plate 32. A plurality of friction discs 33 are interleaved with the friction discs 31 and are splined to a clutch output member 34 to which is formed integral with or otherwise secured to a ring gear 35. A clutch piston 36 is slidably disposed in the clutch input housing 25 such that when fluid pressure is admitted between the clutch housing 25 and the piston 36, the piston is moved into abutting relationship with the friction discs 31 thereby engaging the clutch to provide a drive connection between the shaft 24 and the ring gear 35. A plurality of retraction springs 37 compressed between the piston 36 and a retainer 38 urge the piston out of abutting relationship with the friction disc 31 when fluid pressure is not present.

The externally splined portion 30 has splined thereto a plurality of friction discs 39 which are interleaved with the plurality of friction discs 40 splined to a clutch output member 41. Also splined to the clutch output member 41 is a backing plate 42. A piston 43 is slidably disposed in the clutch output member 41 such that when fluid pressure is admitted between the clutch output member 41 and the piston 43, the piston 43 is moved into abutting relationship with the friction disc 40 to engage the clutch thereby providing a drive connection between the shaft 24 and the clutch output member 41. A plurality of retraction springs 44 are compressed between the piston 43 and a retainer plate 45 to urge the piston 43 out of engagement with the friction disc 40 when fluid pressure is not available, thereby disengaging the clutch. The output member 41 is splined to a shell 46 which in turn is splined at 47 to a sun gear shaft 48. The sun gear shaft 48 has integrally formed therewith or otherwise drivingly connected thereto a pair of sun gears 49 and 50.

The ring gear 35 and sun gears 49 and 50 are components in a planetary gear set which also includes a plurality of pinion gears 51 rotatably mounted on a planet carrier 52, which pinion gears 51 mesh with the ring gear 35 and the sun gear 50. The planetary gear set further includes a plurality of pinion gears 53 which are rotatably mounted on a planet carrier 54, which pinion gears 53 mesh with the sun gears 49 and a ring gear 55. The ring gear 55 and the planet carrier 52 are splined to an output shaft 56 at locations 57 and 58 respectively. The carrier 54 is formed integrally with a brake drum 59 which is encircled by a selectively engageable double-wrap brake band 60. A one way brake 61 also engages the brake drum 59 to provide a one way ground connection between the carrier 54 and the planetary gear housing 12 through a hub 62 which is secured to the planetary gear housing 12. The carrier 54 can be held stationary against one direction of rotation by the one-way brake 61 or against rotation in either direction by the brake band 60. A selectively engageable single wrap band 63 encircles the clutch output member 41 to provide a brake therefore. When the band 63 is engaged the sun gears 49 and 50 are held stationary.

The planetary gear set is selectively operable to provide three forward speed ratios and a reverse speed ratio between the shaft 24 and the transmission output shaft 56. This planetary gearing arrangement is similar in construction to the planetary gearing arrangement disclosed in United States Pat. No. 2,856,794, issued to H. W. Simpson, on Oct. 21, 1958, and reference thereto may be made for a more complete description of the operation of the transmission. Briefly, the three forward speeds and the reverse speed are obtained as follows. First gear is established by energizing piston 36 while the one way brake 61 establishes the carrier 54 as a reaction member. The carrier 54 can also be established as a reaction member through the energization of the double wrap band 60. Second gear is established by maintaining the clutch piston 36 energized and energizing the single wrap band 63 which establishes the sun gears 49 and 50 as reaction members. The one way clutch 61 is automatically disengaged when the band 63 is engaged. The third gear is established by energizing piston 43 while the band 63 is deenergized and the piston 36 remains energized. Reverse drive is established by energizing clutch piston 43 and the double wrap band 60 while the other clutches and brakes are deenergized.

The transmission output shaft 56 is splined to an output gear 64 which is rotatably mounted in bearings 65 and 66. The bearing 65 is supported in a wall 67 which is a portion of the torque converter and differential housing 11. The bearing 66 is supported in the bearing housing 22 which in turn is supported in a wall 68 which is also a portion of the torque converter and differential housing 11. The wall 68 is disposed in a plane parallel to the wall 67. The drive gear 64 meshes with a drive gear 69 which is rotatably mounted by bearings 70 and 71 on a shaft 72. The shaft 72 is disposed in bores 73 and 74 formed in the walls 67 and 68 respectively. The drive gear 69 meshes with a differential input gear 75 which is secured to a differential housing 76 by a plurality of threaded fasteners 77. The differential housing 76 has secured thereto a pinion shaft 78 which rotatably supports a pair of differential pinion gears 79 and 80 which gears 79 and 80 mesh with a pair of side gears 81 and 82. The side gear 81 has splined thereto a differential output shaft 83 which is adapted to drive one wheel of the vehicle through a constant velocity universal joint 84. The side gear 82 has splined thereto an output shaft 85 which is adapted to drive another vehicle wheel through a constant velocity universal joint 86.

The differential output shafts 83 and 85 are supported in the differential housing 76 which is rotatably supported in the torque converter and differential housing 11. When viewed in FIG. 1b the left side of the differential housing 76 and the output shaft 83 are rotatably supported in the wall 67 through a tapered roller bearing 87 and a bearing cap 88. The right side of housing 76 and the output shaft 85 are rotatably supported in a wall 89 through a tapered roller bearing 90. The wall 89 is an integral portion of the torque converter and differential housing 11 and is formed in a plane parallel to the walls 67 and 68. As is well known with differentials, when the reaction force on the driving wheels is equal, the output shafts 83 and 85 will rotate in unison with the differential housing 76. When the torques are not equal the differential output shafts 83 and 85 will rotate relative to the differential housing 76. In either event, the rotary support and alignment of the output shafts 83 and 85 is provided by the torque converter and differential housing 11 through the bearing 87 and 90 respectively.

From the above description it can be seen that the bearing supports in the torque converter and drive shaft housing 11 for the drive gears 64 and 69 and the differential housing 76 and output shafts 83 and 85 are provided by pairs of coaxially aligned bearing supports surfaces. The drive gear 64 is supported in coaxial bores 91 and 92, the drive gear 69 is supported in coaxially aligned bores 73 and 74 and the differential output members are supported in coaxially aligned bores 93 and 94. During the machining of the torque converter and differential housing 11 utilizes a modern machining technique, it is possible to assure accurate alignment of these pairs of bores.

Obviously, many modifications and variations of the present invention are possible in light of the above teachings. It is, therefore, to be understood that within the scope of the appended claims the invention may be practiced otherwise than as specifically described.

What is claimed is:

1. A transversely mounted engine driven transmission comprising a torque converter driven by the engine; a multi-speed planetary gearing arrangement coaxially aligned with and driven by said torque converter; output drive means including a first gear member coaxial with and intermediate said torque converter and said planetary gearing arrangement driven by said planetary gearing arrangement and second gear member parallel with, axially offset from and driven by said first gear member; differential gearing means having two output shafts parallel with and axially offset from said planetary gearing means and said torque converter, and an input gear driven by said second gear member of said output drive gear means; and transmission housing means for enclosing said torque converter, said planetary gearing arrangement, said output drive gear means and said differential gearing means, including a unitary structure having a mounting face adapted to be connected to the engine, a pair of parallel spaced walls having first bearing support means coaxially aligned in said spaced walls for rotatably supporting said first gears member of said output drive gear means and second bearing support means coaxially aligned in said spaced walls axially offset from said first bearing support means for rotatably supporting said second gear member of said output drive gear means, a third wall spaced from and parallel with one of said parallel spaced walls having bearing support means for rotatably supporting one of said output shafts, and third bearing support means in the one parallel spaced wall coaxially aligned with said bearing support means in said third wall for rotatably supporting the other of said output shafts.

2. A transversely mounted engine driven transmission comprising, an engine driven torque converter; multi-speed planetary gear means coaxially aligned with and driven by said torque converter; output drive gearing means disposed between said torque converter and said planetary gear means, being driven by said planetary gear means and including a plurality of intermeshing members; differential gear means driven by said output drive gearing means and including two output shafts disposed parallel to and axially offset from said planetary gear means and said torque converter; transmission housing means for enclosing said torque converter, said planetary gear means, said output drive gearing means and said differential gear means, including a unitary housing member having a mounting face adapted to be connected with the engine, a bell shaped portion adjacent said mounting face having a first wall spaced from and parallel with said mounting face, a second wall spaced from said first wall and being parallel thereto, a third wall depending from a portion of the periphery of said bell shaped portion and being disposed parallel with said second wall, first support surfaces coaxially aligned in said first wall and said second wall, second support surfaces coaxially aligned in said first wall and said second wall and spaced from said first support surfaces and third support surfaces coaxially aligned in said second and third walls and spaced from said first and second support surfaces; first support means disposed in said first support surfaces for rotatably supporting a member of said output drive gearing means; second support means disposed in said second support surfaces for rotatably supporting another member of said output drive gearing means; and third support means disposed in said third support surfaces for rotatably supporting said output shafts.

* * * * *